United States Patent
Peled et al.

(10) Patent No.: US 11,586,232 B2
(45) Date of Patent: Feb. 21, 2023

(54) MONITORING DEVICE

(71) Applicant: AMI Global, Las Vegas, NV (US)

(72) Inventors: Ori Peled, Las Vegas, NV (US); Omer Zeharhary, Las Vegas, NV (US)

(73) Assignee: AMI Global, Las Vegas, NV (US)

( * ) Notice: Subject to any disclaimer, the term of this patent is extended or adjusted under 35 U.S.C. 154(b) by 388 days.

(21) Appl. No.: 16/853,183

(22) Filed: Apr. 20, 2020

(65) Prior Publication Data
US 2021/0325920 A1 Oct. 21, 2021

(51) Int. Cl.
| | |
|---|---|
| *G05D 27/02* | (2006.01) |
| *G01K 13/08* | (2006.01) |
| *G01K 1/14* | (2021.01) |
| *G05D 19/02* | (2006.01) |
| *G05D 23/19* | (2006.01) |
| *G01H 1/00* | (2006.01) |
| *G01K 1/16* | (2006.01) |
| *G01K 1/024* | (2021.01) |

(52) U.S. Cl.
CPC ............ *G05D 27/02* (2013.01); *G01H 1/003* (2013.01); *G01K 1/14* (2013.01); *G01K 1/16* (2013.01); *G01K 13/08* (2013.01); *G05D 19/02* (2013.01); *G05D 23/1917* (2013.01); *G01K 1/024* (2013.01); *G05B 2223/06* (2018.08)

(58) Field of Classification Search
CPC .... G05D 27/02; G05D 19/02; G05D 23/1917; G01H 1/003; G01K 1/14; G01K 1/16; G01K 13/08; G01K 1/024; G05B 2223/06
See application file for complete search history.

(56) References Cited

U.S. PATENT DOCUMENTS

| | | | | |
|---|---|---|---|---|
| 5,952,803 A | * | 9/1999 | Canada ................ | G01R 33/028 73/431 |
| 6,006,164 A | * | 12/1999 | McCarty ............. | G01M 13/028 702/56 |
| 2012/0319866 A1 | * | 12/2012 | Svoen ...................... | H04Q 9/00 73/649 |
| 2014/0022058 A1 | * | 1/2014 | Striemer .............. | G06K 19/077 340/10.1 |
| 2015/0211581 A1 | * | 7/2015 | Murphy ................ | F16C 41/008 340/682 |
| 2017/0052059 A1 | * | 2/2017 | Smith ..................... | H04W 4/00 |
| 2017/0206446 A1 | * | 7/2017 | Lesesky ........... | G06K 19/07764 |
| 2020/0103894 A1 | * | 4/2020 | Celia ......................... | H04L 1/18 |

* cited by examiner

*Primary Examiner* — Nathaniel T Woodward
*Assistant Examiner* — Philip L Cotey
(74) *Attorney, Agent, or Firm* — Elevated IP, LLC

(57) ABSTRACT

A wireless and cellular vibration monitoring device (2) comprising a connection structure (6) suitable for attaching the monitoring device (2) to equipment to be monitored is disclosed. The monitoring device (2) comprises a temperature sensor (8) and a vibration sensor (10) configured to remotely monitor vibration and temperature transferred to the monitoring device (2) via the connection structure (6). The device comprises an integrated satellite-based radio-navigation system for location detection. The monitoring device (2) comprises a metal base (4) comprising a body portion (56) comprising a threaded portion (6) constituting the connection structure (6). The threaded portion (6) comprises male threads and protrudes from the body portion (56) of the base (4). The temperature sensor (8) is thermally connected to the body portion (56) of the base (4).

20 Claims, 12 Drawing Sheets

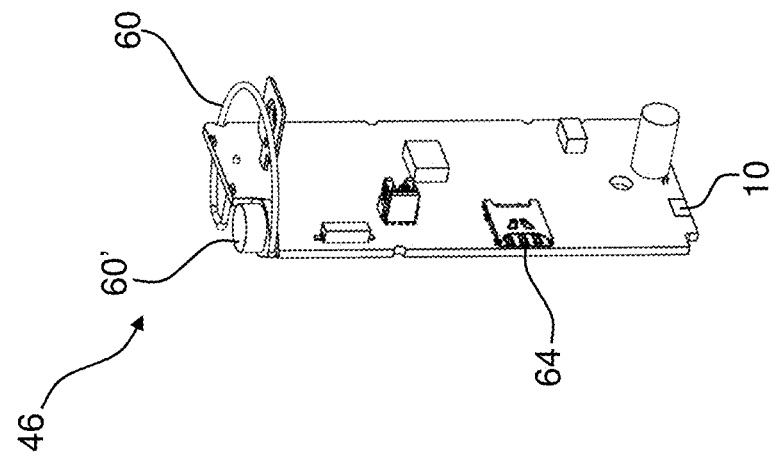
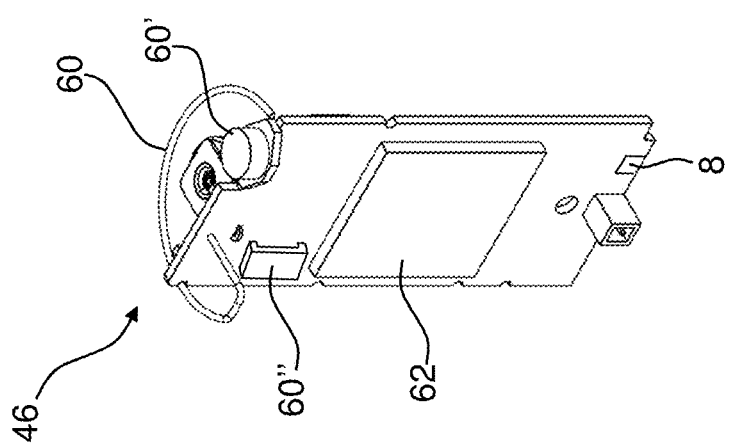
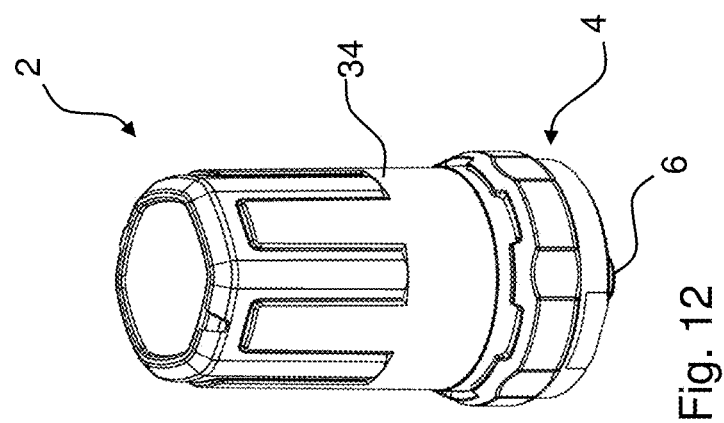

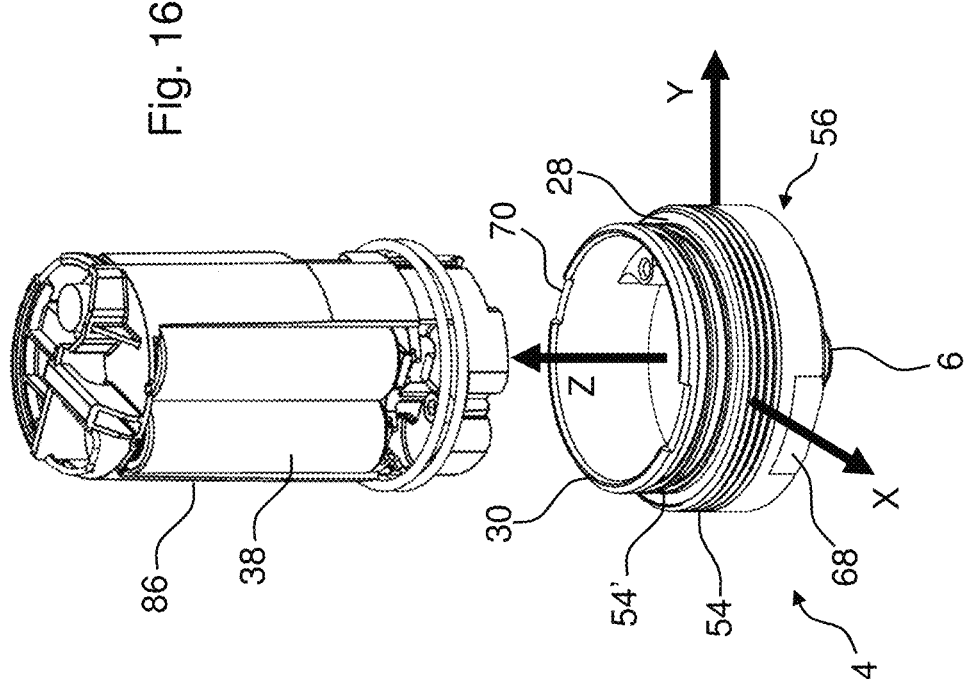
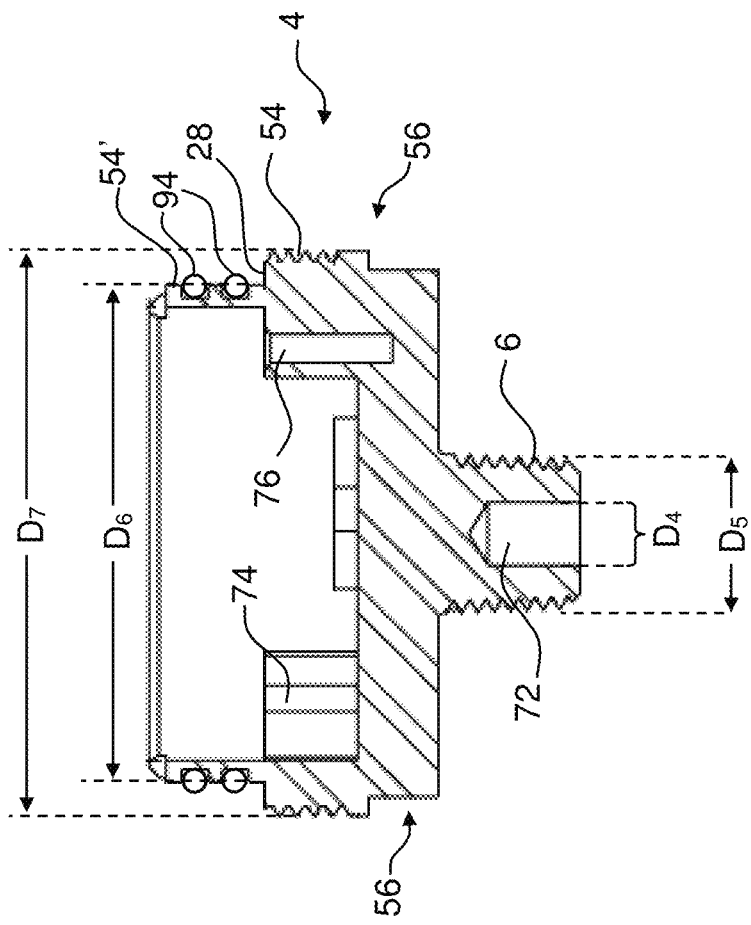

MONITORING DEVICE

FIELD OF INVENTION

The present invention relates to a monitoring device for remote temperature and vibration monitoring of rotating equipment such as pumps or motors.

BACKGROUND

Monitoring devices for remotely monitoring temperature and vibration of rotating equipment such as pumps or motors are known. Some of these monitoring devices comprise separate sensors for detecting vibration and temperature parameters.

It has, however, been found that the temperature measurements made by prior art monitoring devices do not with a sufficiently high accuracy correspond to the temperature of the media to be measured. Moreover, the prior art monitoring devices fail to detect changes in temperature in a sufficiently fast manner.

Thus, there is a need for an improved monitoring device for remotely monitoring temperature and vibration of rotating equipment such as pumps or motors, by which monitoring device it is possible to reduce or even eliminate the above-mentioned disadvantages of the prior art.

It is an object to provide a monitoring device for remotely monitoring temperature and vibration of rotating equipment such as pumps or motors, which monitoring device can detect the temperature changes of a media or structure to be monitored in a faster, more reliable and accurate manner than the prior art solutions.

SUMMARY OF THE INVENTION

The object of the present invention can be achieved by a monitoring device as defined in claim 1. Preferred embodiments are defined in the dependent subclaims, explained in the following description and illustrated in the accompanying drawings.

The monitoring device according to the invention is a wireless and cellular vibration monitoring device comprising a connection structure suitable for attaching the monitoring device to equipment to be monitored, wherein the monitoring device comprises a temperature sensor and a vibration sensor configured to remotely monitor vibration and temperature transferred to the monitoring device via the connection structure, wherein the device comprises an integrated satellite-based radio-navigation system for location detection, wherein the monitoring device comprises a metal base comprising a body portion and a threaded portion constituting the connection structure, wherein the threaded portion comprises threads and protrudes from the body portion of the base, wherein the temperature sensor is thermally connected to the body portion of the base.

Hereby, it is possible to detect the accurate temperature of the base in a reliable manner. Moreover, temperature changes of a media or structure being in thermal contact with the body portion of the base can be detected in a fast and reliable and accurate manner.

The monitoring device makes it possible to provide improved (more accurate) oil temperature measurement e.g. on a single-stage end suction centrifugal pump e.g. an end-suction pump that conforms to the dimensional envelope described in the American National Standards Institute (ANSI) pump standard.

The integrated satellite-based radio-navigation system for location detection may be integrated in a printed circuit board of the monitoring device.

By the phrase "temperature sensor is thermally connected to the body portion of the base" is meant that heat can flow between the temperature sensor and the body portion of the base by way of thermal conduction.

In one embodiment, the threaded portion of the base comprises male threads. Hereby, the threaded portion can be screwed into a threaded bore of the equipment and an easy and reliable attachment of the monitoring device to the equipment can be provided.

In one embodiment, the body portion comprises a contact surface extending perpendicular to the longitudinal axis of the body portion, wherein the temperature sensor comprises a contact surface that is brought in thermal contact with the contact surface of the body portion.

Hereby, it is possible to provide an optimum thermal connection between the temperature sensor and the body portion. Accordingly, an improved temperature measurement (higher accuracy and faster detection of temperature changes) can be achieved.

It may be an advantage that the monitoring device is configured to monitor rotating equipment (e.g. a pump).

In one embodiment, the base comprises a wall extending along the longitudinal axis of the body portion of the base and a contact surface provided on a structure protruding from the inside surface of the wall of the base. Hereby, it is possible to thermally connect the temperature sensor to the contact surface in order to provide reliable temperature measurements.

In one embodiment, the contact surface extends perpendicular to the longitudinal axis of the body portion, wherein the temperature sensor comprises a plate-shaped contact area that is brought in thermal contact with the contact surface.

In one embodiment, the contact area of the temperature sensor is attached to the contact surface by means of thermally conductive gel.

In one embodiment, the contact area of the temperature sensor is attached to the contact surface by means of thermally conductive adhesive.

In one embodiment, the monitoring device is battery driven and comprises a battery assembly configured to receive a plurality of cylindrical commercially available batteries, wherein the battery assembly is enclosed within a shell.

In one embodiment, the monitoring device is battery driven and comprises a battery housing configured to receive a plurality of cylindrical commercially available batteries, wherein the battery assembly is enclosed within a shell.

Hereby, the batteries can easily be accessed (since they are commercially available). This is beneficial when the batteries have to be replaced.

In one embodiment, the battery assembly comprises an upright wall portion allowing an upright mounting of the batteries.

In one embodiment, the battery housing comprises an upright wall portion allowing an upright mounting of the batteries.

Hereby, it is possible to provide a compact monitoring device.

In one embodiment, the shell is configured to hermetically enclose and seal the monitoring device so that the space inside the shell is so tightly closed that no air can leave or enter the monitoring device.

Hereby, it is possible to provide a monitoring device that is allowed in an environment with an explosive atmosphere and fulfills the criteria of the "Appareils destinés à être utilisés en ATmosphères Explosives" ATEX directive that consists of two EU directives describing what equipment and work space is allowed in an environment with an explosive atmosphere. It is important to underline, that it is possible to provide a monitoring device that can achieve an ATEX certification, wherein batteries can still be easily replaced by the user. Thus, the monitoring device according to the invention can be used in potentially explosive atmospheres.

In one embodiment, the monitoring device comprises a printed circuit board, wherein the vibration sensor and the temperature sensor are integrated in the printed circuit board.

Hereby, it is possible to simplify the monitoring device and at the same time provide a reliable and robust construction.

In one embodiment, the temperature sensor is arranged in such a position of the printed circuit board that the temperature sensor is brought into direct contact with the base. Hereby, it is possible to provide reliable temperature measurements. The temperature sensor can provide reliable temperature measurements of the base of the monitoring device and thus the equipment (e.g. a pump) to which the monitoring device is attached.

In one embodiment, a printed circuit board is arranged to extend in an upright orientation, in which the longitudinal axis of the printed circuit board extends parallel to longitudinal axes of the batteries.

In one embodiment, the monitoring device comprises a locking ring arranged to lockingly fix the shell to the base. Hereby, it is possible to hermetically enclose and seal the monitoring device in an efficient and cost-effective manner.

In one embodiment, a sealing structure (e.g. an O-ring or gasket) is provided between adjacent structures in order to tightly seal the monitoring device.

In one embodiment, the shell comprises a cylindrical portion provided with a fastening structure, wherein the locking ring is provided with a fastening structure arranged and shaped to fit the fastening structure of the cylindrical portion. Hereby, correct positioning of the locking ring can be eased.

The (e.g. male) fastening structure of the locking ring will engage with the corresponding (e.g. female) fastening structure of the cylindrical portion when the locking ring is pressed in place hereby surrounding the cylindrical portion of the shell. The use of such locking ring provides a simple, reliable and easy way of securing the shell to the base of the monitoring device.

In one embodiment, the cylindrical portion comprises a male fastening structure, wherein the locking ring is provided with a female fastening structure arranged and shaped to fit the male fastening structure of the cylindrical portion.

In one embodiment, the width of the threaded portion is smaller than the width of the body portion.

In one embodiment, the body portion comprises a flange. Hereby, the shell can be attached to the base by means of engagement of two corresponding threaded structures in a manner in which the outer surface of the proximal portion of the shell is aligned with the outside surface of the body portion.

In one embodiment, a threaded portion protrudes from the flange, wherein the threaded portion has a width that is smaller than the width of the body portion and larger than the width of the threaded portion.

Hereby, it is possible to provide a temperature detection, wherein a thermal equilibrium between the structure to which the monitoring device is attached and the body portion can be established very fast. Said thermal equilibrium is established through a heat flow that levels out temperature differences between the structure to which the monitoring device is attached and the body portion.

In one embodiment, the monitoring device comprises one or more ring sealing gaskets arranged to seal between the shell and a threaded portion of the base.

Upon screwing the shell, the ring sealing gaskets will be radially compressed. Hereby, the ring sealing gaskets will be axially deformed along the longitudinal axis of the base. This deformation will cause a sealing between the shell and the base.

It may be an advantage that the threaded portion of the base is provided with one or more grooves each configured to receive a ring sealing gasket.

In one embodiment, the height of the threaded portion is larger than the height of the body portion.

Hereby, it is possible to provide a temperature detection, wherein a thermal equilibrium between the structure to which the monitoring device is attached and the body portion can be established very fast. Said thermal equilibrium is established through a heat flow that levels out temperature differences between the structure to which the monitoring device is attached and the body portion.

In one embodiment, the body portion comprises a first protruding portion provided with a hole.

In one embodiment, the body portion comprises a second protruding portion provided with a hole.

It may be an advantage that the holes are arranged and configured to receive a male engagement structure, such as a screw. Hereby, it is possible to fix the electrical components of the monitoring device firmly to the body portion of the base.

In a preferred embodiment, the first protruding portion protrudes from an inside surface of a wall of the body portion.

In one embodiment, a central bore is provided in the threaded portion protruding from the body portion of the base. Hereby, it is possible to attach the base to a male connection structure (e.g. a threaded rod).

In one embodiment, a threaded portion protrudes from the flange, wherein the threaded portion has a height that is smaller than the height of the body portion, wherein the height of the body portion is smaller than the height of the threaded portion.

In one embodiment, the monitoring device is configured to detect and store one or more temperature signals and one or more vibration signals.

In one embodiment, the monitoring device is configured to detect and store one or more speed signals derived from one or more of the one or more vibration signals.

In a preferred embodiment, the monitoring device is configured to be used with hydraulic fluid circuits with the purpose of determining the state of wear on a pump.

In a preferred embodiment, the monitoring device is configured to be mounted on rotating equipment such as pumps or motors and monitor several parameters with the purpose of determining the health of the mechanical components through vibration and temperature.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 12 shows a perspective view of a monitoring device according to the invention;

FIG. 13 shows a perspective view of a printed circuit board of a monitoring device according to the invention;

FIG. 14 shows another perspective view of the printed circuit board shown in FIG. 13;

FIG. 15 shows a cross-sectional view of a base of a monitoring device according to the invention;

FIG. 16 shows a perspective view of some of the main components of a monitoring device according to the invention;

DETAILED DESCRIPTION OF THE INVENTION

Figure 1:
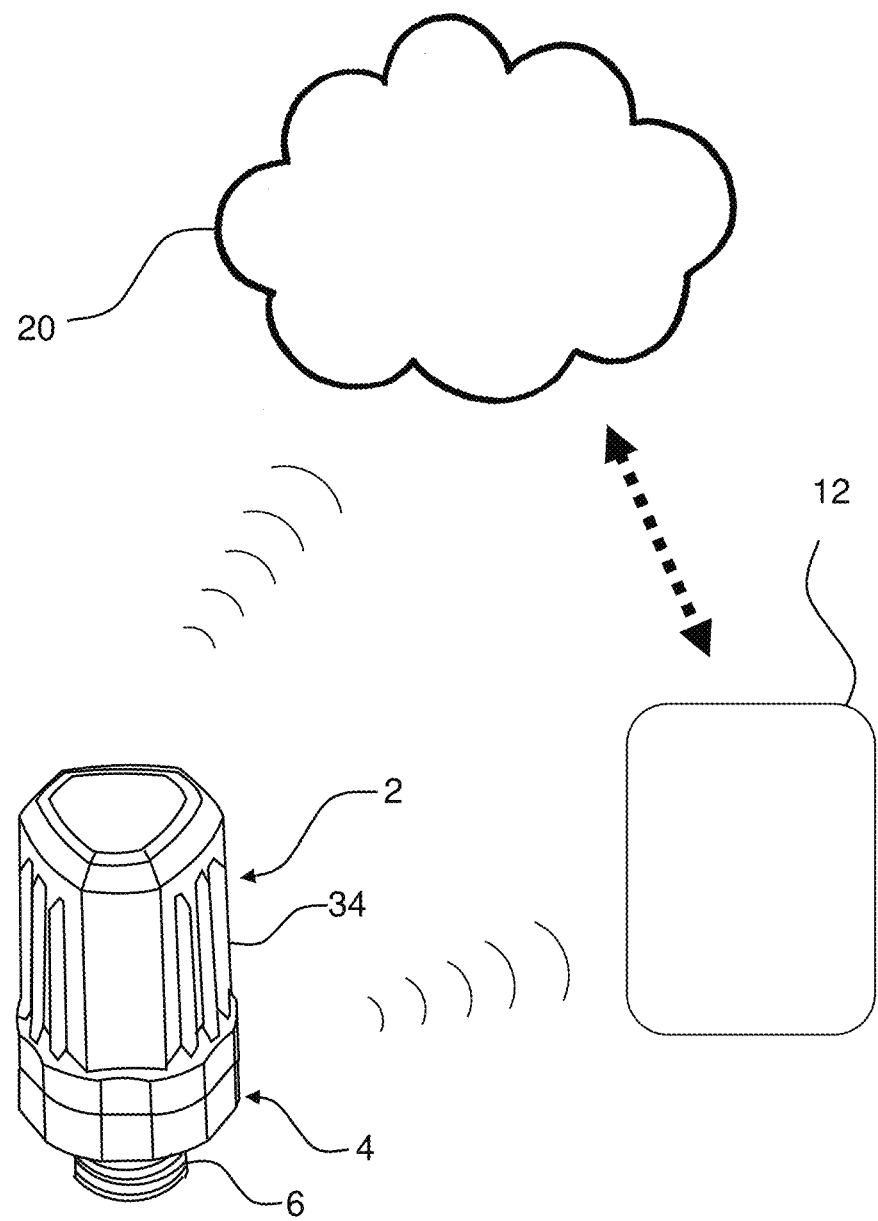
FIG. 1 shows a monitoring device according to the invention configured to communicate with a gateway.

Referring now in detail to the drawings for the purpose of illustrating preferred embodiments of the present invention, a monitoring device 2 of the present invention is illustrated in FIG. 1.

FIG. 1 illustrates a wireless and cellular vibration monitoring device 2 according to the invention. The monitoring device 2 is configured to communicate with a gateway 12 that communicates wirelessly with a cloud-based structure 20 configured to receive and process data received from the gateway 12.

The monitoring device 2 is also configured to function as a stand-alone system configured to wirelessly transmit data to the cloud-based structure 20 via a cellular network integrated in the monitoring device 2.

Accordingly, the monitoring device 2 is configured to measure vibration and temperature and optionally other relevant parameters and store the measured data and further transmit the data or accumulated data:

a) Directly to the cloud-based structure 20 via any suitable wireless broadband communication standard for mobile devices. In one embodiment, the Long-Term Evolution (LTE) communication standard is applied or b) To the gateway 12 via local area network (LAN) (e.g. at a frequency of 900 MHz) or by a cellular connection.

The monitoring device 2 is configured to be operated in various modes. In one embodiment, the monitoring device 2 is powered in a battery-operated mode by means of one or more replaceable batteries arranged in an integrated battery assembly.

In one embodiment, the monitoring device 2 is powered by three AA type lithium cell batteries.

In another embodiment, the monitoring device 2 is powered in an external power mode, in which the monitoring device 2 is powered by a wired connection to an electrical energy source (e.g. the main or an electrical connection at the equipment, at which the monitoring device 2 is mounted to monitor vibration and temperature).

When the monitoring device 2 is used as a stand-alone cellular connection communication wirelessly with the cloud-based structure 20, the monitoring device 2 can be operated in one of the following modes:

1) A low-power battery operated mode, in which the device is sleeping most of the time and wakes up with a predefined frequency (e.g. every 15 minutes) to sample and log the monitored data which is uploaded in predefined upload times.

2) An external power operated mode, in which the monitoring device 2 is connected to an external power source by means of a wired connection. In one embodiment, the external power source is a direct current (DC) power source providing a voltage in the range 12-24 Volts.

If an external power source is available, it is possible to maintain the monitoring device 2 in a state of operation, in which a cellular connection of the monitoring device 2 is maintained online so that all data records are uploaded after logging (dynamic uploads).

In one embodiment, the monitoring device 2 is operated in a mode, in which the monitoring device 2 communicates with the gateway 12 either by a LAN or cellular connection. In this mode, the gateway is always turned on and connected to the cloud-based structure 20.

In one embodiment, the monitoring device is battery operated, wherein power consumption is minimized by operating the monitoring device 2 in a mode, in which the monitoring device 2 is sleeping most of the time and wakes up according to a predefined schedule (e.g. every 15 seconds) to send keep-alive data to the gateway 12 and sample and log detected data according to a predefined schedule (e.g. every 15 minutes) and sending data to the gateway 12. The gateway 12 uploads the data records to the cloud-based structure 20 as soon as the gateway 12 has received the data. In one embodiment, the monitoring device provides no offline logging.

When an external power source is available and connected to the monitoring device 2, the monitoring device 2 will be operated in a mode, in which the monitoring device 2 is maintained connected to the gateway 12 and never goes to sleep. Data sample and logging may be carried out in the same way in this mode as when the monitoring device 2 is battery operated.

The monitoring device 2 comprises a metal base 4 comprising a cylindrical body portion and a threaded portion 6 protruding therefrom. The threaded portion 6 comprises a male thread and is configured to be screwed into a corresponding female thread of a receiving structure of the equipment that the monitoring device 2 is intended to remotely monitor.

Figure 11:
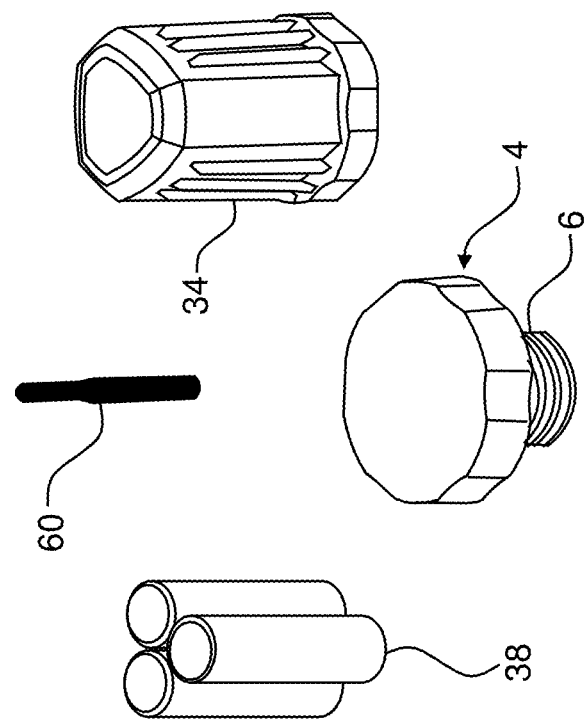
FIG. 11 shows some of the main components of a monitoring device according to the invention.

The monitoring device 2 comprises a shell 34 enclosing a plurality of main components of the monitoring device 2 (see FIG. 11).

Figure 2:
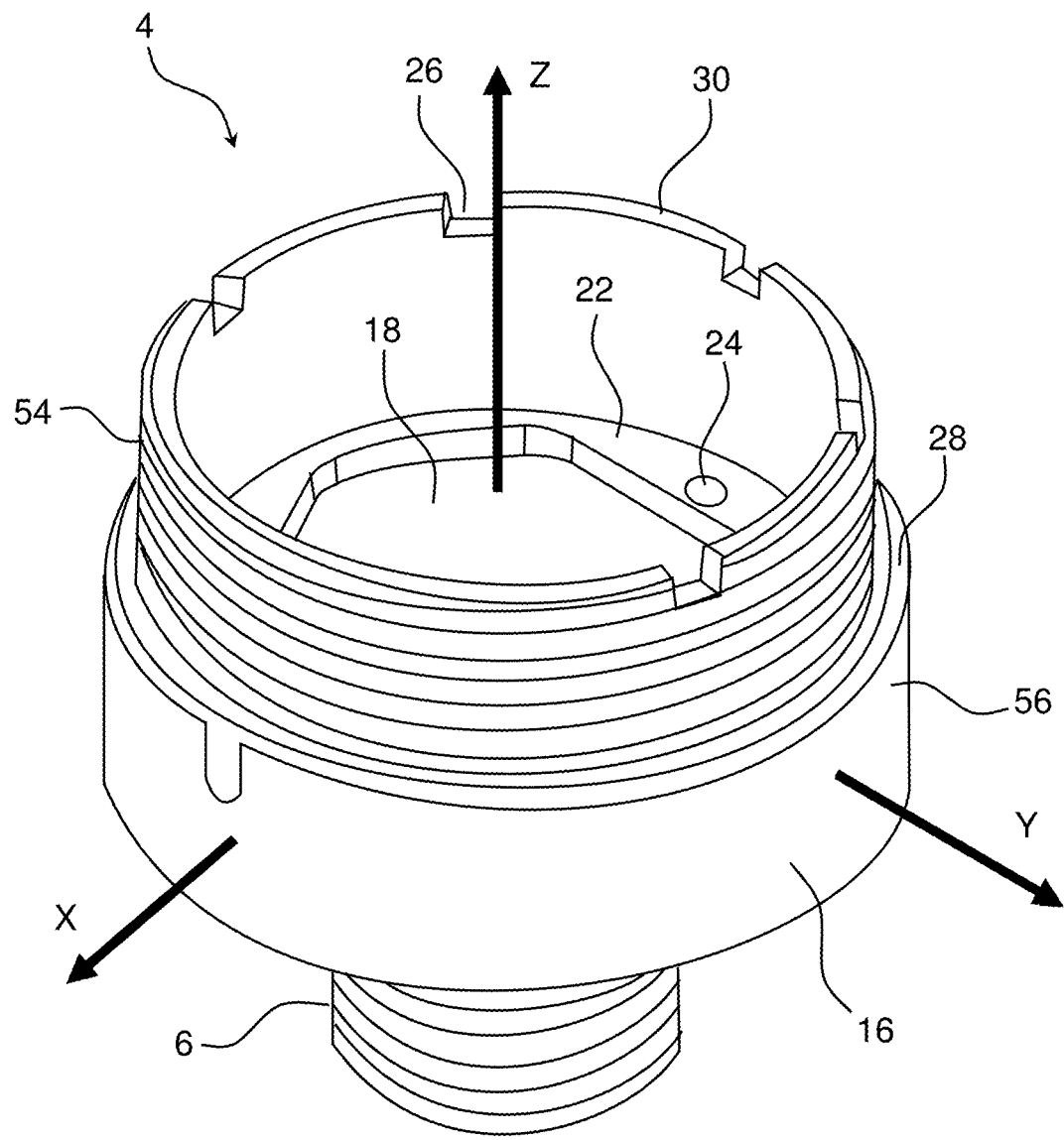
FIG. 2 shows a close-up perspective view of a base of a monitoring device according to the invention.

FIG. 2 illustrates a close-up perspective view of a base 4 of a monitoring device according to the invention. A Cartesian coordinate system having three axes X, Y, Z is indicated. The Z axis extends along the longitudinal axis of the base 4. The X axis and the Y axis extend perpendicular to each other and to the Z axis.

The base 4 comprises a cylindrical body portion 56 having a longitudinal axis that extends parallel to the Z axis.

In one embodiment, the body portion 56 is box-shaped.

In another embodiment, the body portion 56 has a cross-sectional area (when cut in a plane parallel to the X axis and the Y axis) formed as a simple polygon, preferably a regular convex polygon.

The body portion 4 is provided with a flange 28 and a wall 30 extending from the flange 28. The wall 30 is provided with a threaded portion 54 constituting a male thread configured to receive a corresponding female thread of a shell (see FIG. 1 or FIG. 3).

Figure 4:
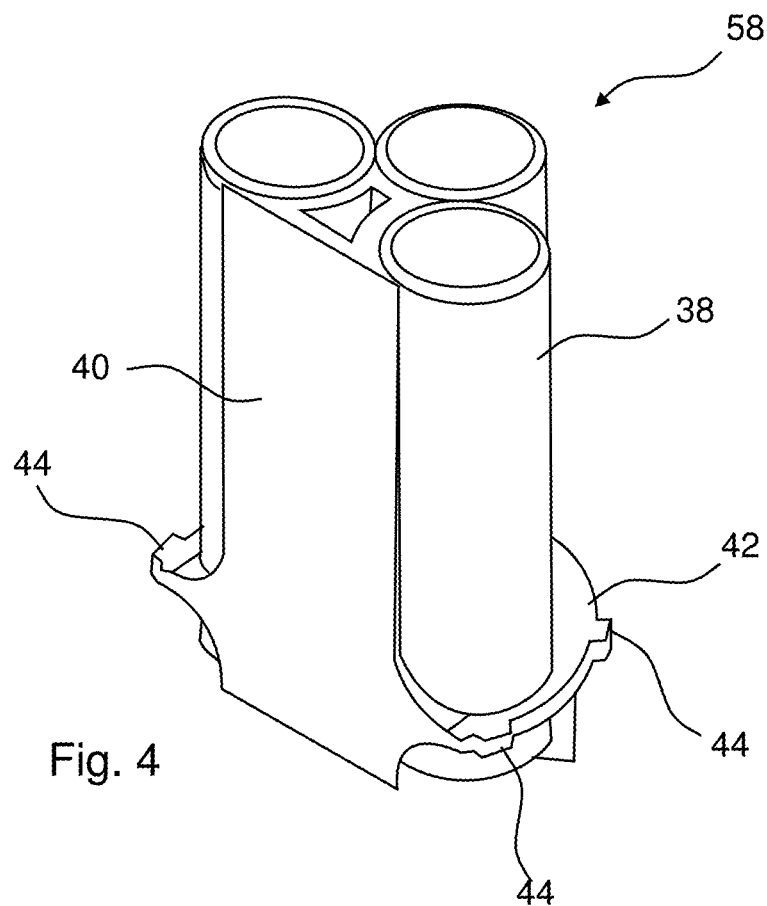
FIG. 4 shows a perspective view of a battery assembly according to the invention.

A plurality of recesses 26 are provided along the rim of the wall 30. These recesses 26 are configured to receive corresponding male engagement structures as shown in FIG. 4.

A support structure provided with a contact surface 22 protruding from the inside of the wall 30. The contact surface 22 has a planar top side. However, a large opening 18 and a smaller hole 24 are provided in the contact surface 22.

In one embodiment, the monitoring device comprises a temperature sensor (not shown) extending at least partly through the opening 18.

In one embodiment, the monitoring device comprises a temperature sensor (not shown) extending at least partly through the hole 24.

In one embodiment, the monitoring device comprises a temperature sensor (not shown) attached to or integrated in the support structure 22.

Figure 3:
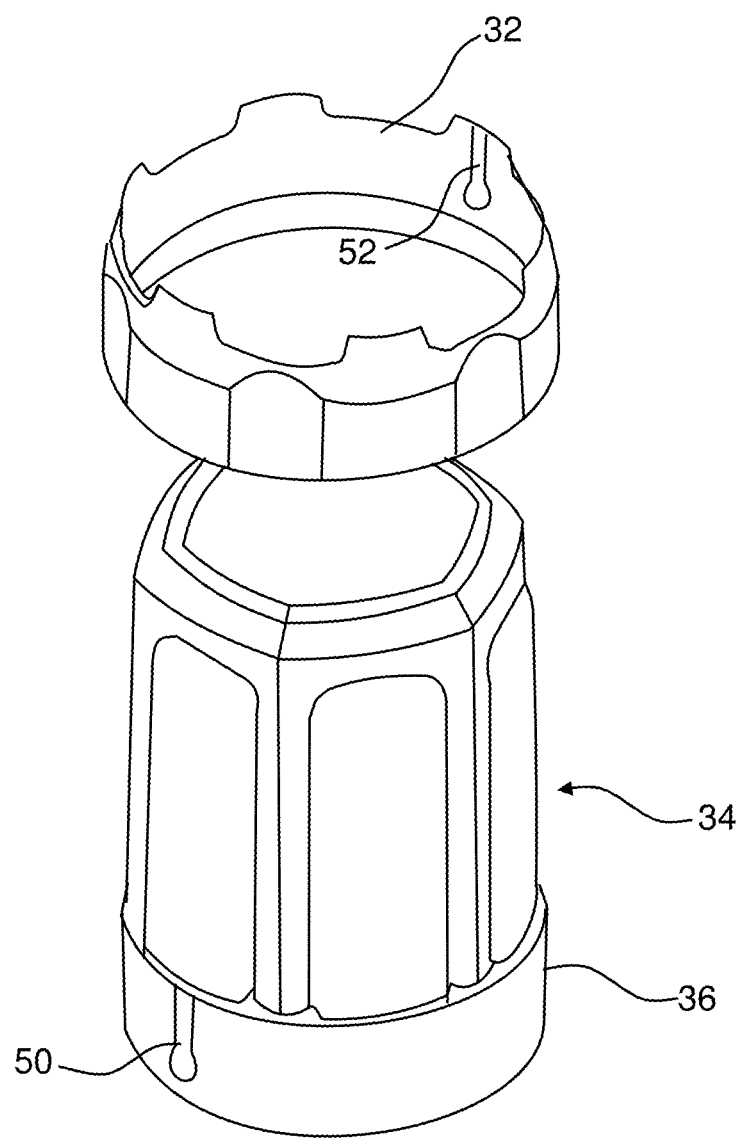
FIG. 3 shows a shell and a locking ring according to the invention.

FIG. 3 illustrates a shell 34 and a locking ring 32 according to the invention. The shell 34 comprises a cylindrical portion 36 provided with female threads (not shown) being configured to be screwed onto the male threads of the wall 30 shown in FIG. 2. Hereby, the shell 34 can be firmly and detachably attached to the base 4 shown in FIG. 2. The cylindrical portion 36 is provided with a female fastening structure 50.

The locking ring 32 is provided with a male fastening structure 52 arranged and shaped to fit the female fastening structure 50 of the cylindrical portion 36. Accordingly, the male fastening structure 52 of the locking ring 32 will engage with the corresponding female fastening structure 50 of the cylindrical portion 36 when the locking ring 32 is pressed in place hereby surrounding the cylindrical portion 36 of the shell 34. The use of the locking ring 32 provides a simple, reliable and easy way of securing the shell 34 to the base of the monitoring device.

FIG. 4 illustrates a perspective view of a battery assembly 58 according to the invention. The battery assembly 58 comprises a support plate 42 and a wall portion 40 protruding from the support plate 42. The wall portion 40 and the support plate are shaped to receive and maintain three AA type lithium cell batteries 38 arranged in an upright configuration. The battery assembly 58 is optimized in order to minimize the footprint of the battery assembly 58. In one embodiment, the support plate 42 comprises cylindrical receiving structures shaped and arranged to receive the distal end of a battery 38.

The support plate 42 is provided with a plurality of male engagement structures 44 protruding from the rim of the support plate. The male engagement structures 44 are distributed and shaped in order to fit into the recesses 26 provided along the rim of the wall 30 of the base 4 shown in FIG. 2.

The wall portion 40 comprises a planar surface facing away from the batteries 28. When the battery assembly 58 is mounted in a monitoring device according to the invention, the battery assembly 58 leaves plenty of room for a printed circuit board and other essential components such as an antenna.

Figure 5:
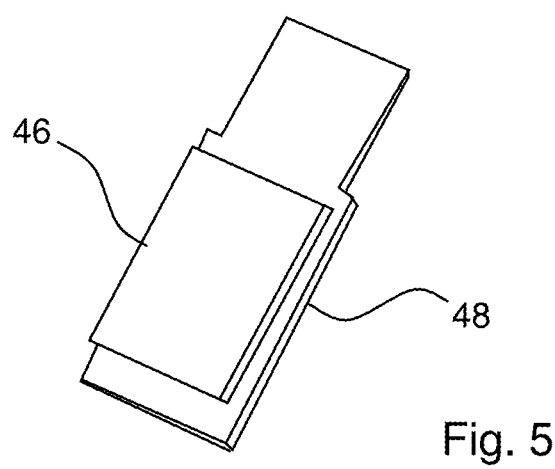
FIG. 5 shows a perspective view of a printed circuit board battery of a monitoring device according to the invention.

FIG. 5 illustrates a perspective view of a printed circuit board 46 of a monitoring device according to the invention. The printed circuit board 46 is arranged on a planar plate member 48. In one embodiment, the planar plate member 48 is made in an electrically insulating material. In one embodiment, the planar plate member 48 is made in a thermally insulating material.

Figure 6:
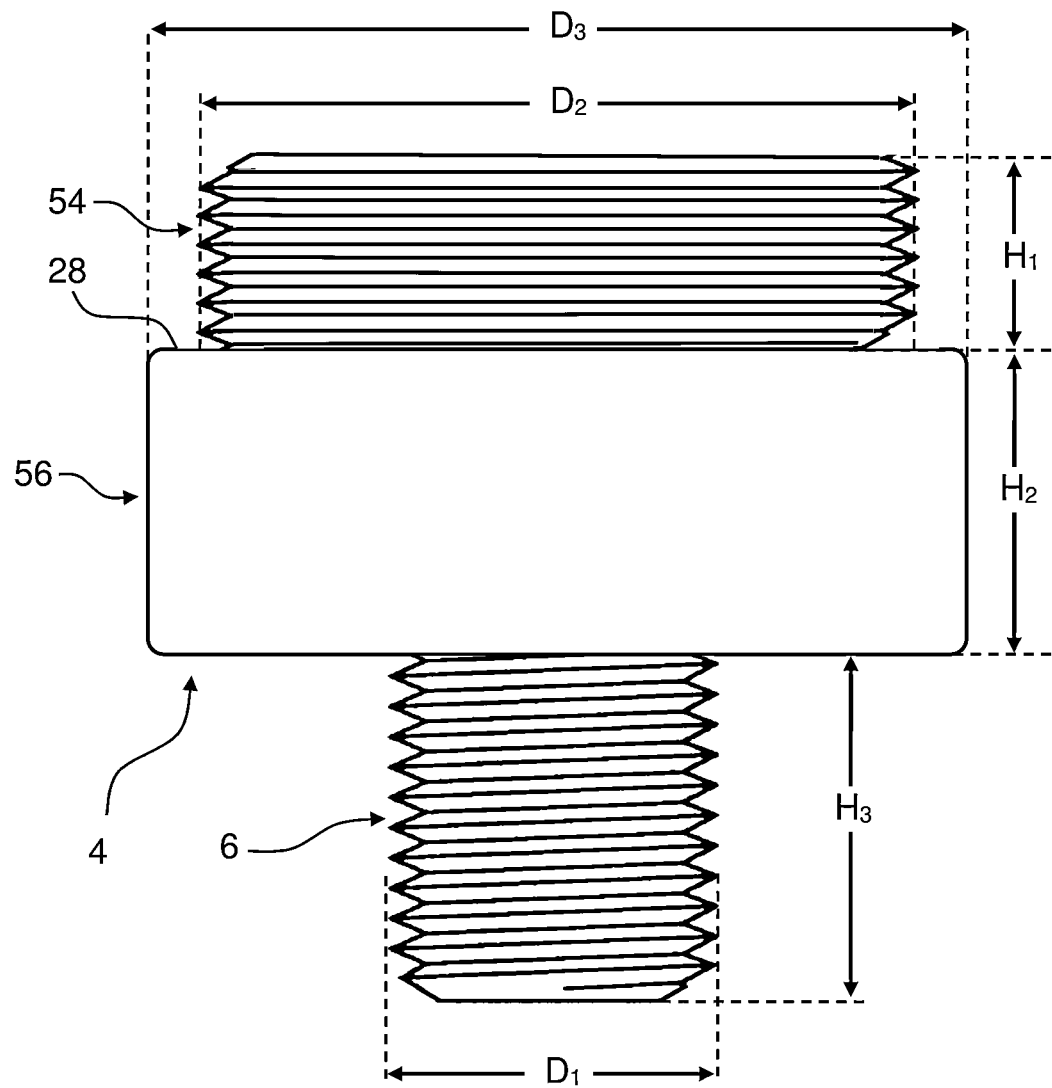
FIG. 6 shows a side view of a base of a monitoring device according to the invention.

FIG. 6 illustrates a side view of a base 4 of a monitoring device according to the invention. The base 4 comprises a metal body portion 56 having a flange 28 and a width $D_3$. A threaded portion 6 is made in metal and has a width $D_1$ that is smaller than the width $D_3$ of the body portion 56. The threaded portion 6 is configured to be screwed into a receiving structure provided with corresponding female threads.

A threaded portion 54 has a width $D_2$ that is smaller than the width $D_3$ of the body portion 56 and larger than the width $D_1$ of the threaded portion 6 that protrudes from the body portion 56. The threaded portion 54 comprises a male thread configured to receive a correspond female thread of a shell corresponding to the one shown in FIG. 3.

The body portion 56 has a height $H_2$ that is slightly larger than the height $H_1$ of the threaded portion 54. The threaded portion 6 has a height $H_3$ that is larger than the height $H_2$ of the body portion 56. Accordingly, in a preferred embodiment, one or more of the following relations are fulfilled:

$$D_3 > D_2 > D_1 \qquad \text{A)}$$

$$H_3 > H_2 > H_1 \qquad \text{B)}$$

In one embodiment, one or more of the following relations are fulfilled:

$$D_3 > \frac{2}{3} D_1 \qquad \text{C)}$$

$$H_3 > \frac{2}{3} H_1 \qquad \text{D)}$$

In one embodiment, one or more of the following relations are fulfilled:

$$D_3 > \frac{1}{2} D_1 \qquad \text{E)}$$

-continued $$H_3 > \frac{1}{2}H_1 \quad \text{F)}$$

In one embodiment, one or more of the following relations are fulfilled:

$$D_3 > \frac{3}{4}D_1 \quad \text{G)}$$

$$H_3 > \frac{3}{4}H_1 \quad \text{H)}$$

Figure 9:
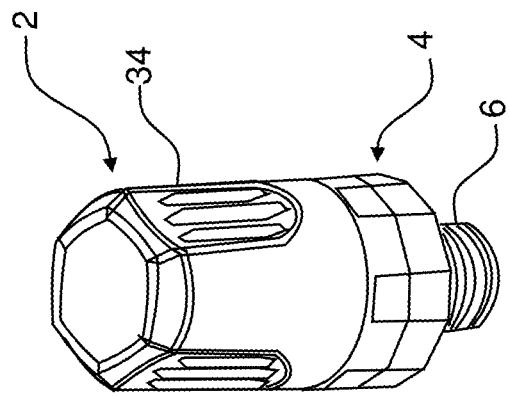
FIG. 9 shows a perspective view of a monitoring device according to the invention.
Figure 8:
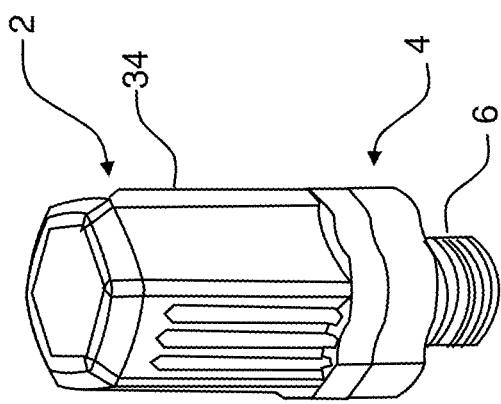
FIG. 8 shows a perspective view of a monitoring device according to the invention.
Figure 7:
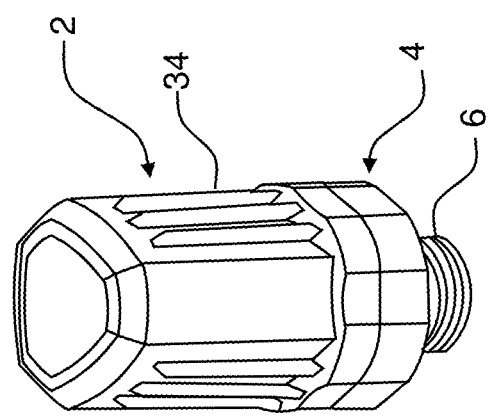
FIG. 7 shows a perspective view of a monitoring device according to the invention.

FIG. 7 illustrates a perspective view of a monitoring device 2 according to the invention. FIG. 8 illustrates a perspective view of a monitoring device 2 according to the invention. FIG. 9 shows a perspective view of a monitoring device 2 according to the invention.

Each of the monitoring devices 2 illustrated in FIGS. 7-9 comprises a metal base 4 comprising a threaded portion 6 made in metal. The base 4 and the threaded portion 6 basically correspond to the ones shown and explained with reference to FIG. 2.

Each of the monitoring devices 2 comprises a shell 34 having a slightly different geometry. However, the function and basic structure of each of these shells 34 correspond to the one shown and explained with reference to FIG. 1. and FIG. 3.

Figure 10:
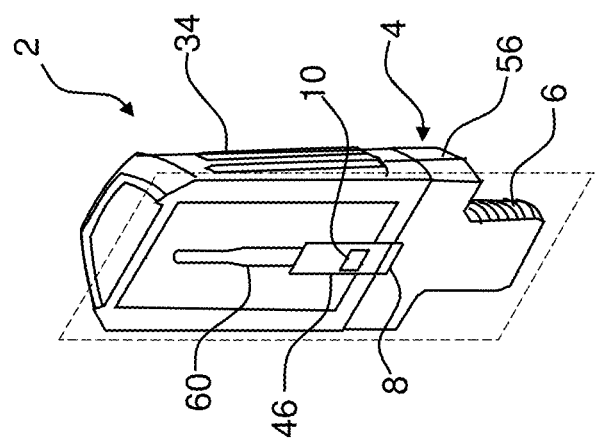
FIG. 10 shows a perspective cross-sectional view of a monitoring device according to the invention.

FIG. 10 illustrates a perspective, schematic, cross-sectional view of a monitoring device 2 according to the invention. The monitoring device 2 comprises a threaded portion 6 protruding from the body portion of the base 4. The threaded portion 6 is solid and made of a metal.

A temperature sensor 8 is arranged in direct contact with the body portion 56 of the base 4. Hereby, the temperature sensor 8 can detect the accurate temperature of the base 4 in a reliable manner. Moreover, temperature changes of a media or structure being in thermal contact with the body portion 56 of the base 4 can be detected in a fast, reliable and accurate manner.

The temperature sensor 8 is arranged centrally at the top surface of the body portion 56 of the base 4. The temperature sensor 8 is electrically connected to a printed circuit board 46 that is electrically connected to an antenna 60. Moreover, a vibration sensor 10 is provided as an integrated part of the printed circuit board 46. In one embodiment, the vibration sensor 10 is an accelerometer. In one embodiment, the vibration sensor 10 is a multi-axis accelerometer. In a preferred embodiment, the vibration sensor 10 is a three-axis accelerometer.

A shell 34 encloses the components 8, 46, 60 of the monitoring device 2. In one embodiment, the shell 34 is configured to hermetically enclose and seal the monitoring device 2 so that the space inside the shell 34 is so tightly closed that no air can leave or enter it.

FIG. 11 illustrates some of the main components of a monitoring device according to the invention. The monitoring device comprises three AA type lithium cell batteries 38, an antenna 60, a shell 34 and a base 4 having a threaded portion 6. These components basically correspond to the ones shown and explained with reference to the previous figures.

FIG. 12 illustrates a perspective view of a monitoring device 2 according to the invention. The monitoring device 2 comprises a metal base 4 comprising a cylindrical body portion and a threaded portion 6 protruding therefrom. The threaded portion 6 comprises a male thread that is configured to be screwed into a corresponding female thread of a receiving structure. Accordingly, the monitoring device 2 can be securely attached to the equipment that the monitoring device 2 is intended to remotely monitor.

The monitoring device 2 comprises a shell 34 enclosing a plurality of main components of the monitoring device 2.

FIG. 13 illustrates a perspective view of a printed circuit board 46 of a monitoring device 2 according to the invention, whereas FIG. 14 illustrates another perspective view of the printed circuit board shown in FIG. 13. The printed circuit board 46 comprises a non-conductive substrate shaped as an elongated plate. On one side (shown in FIG. 13) of the substrate a cellular module is centrally arranged. In the upper portion of the substrate a 900 MHz antenna 60 is arranged. In the upper portion of the substrate a Near Field Communication (NFC) antenna 60' protrudes from a recessed portion of the substrate. Furthermore, a cellular antenna 60" is arranged slightly below the 900 MHz antenna 60. At the lower portion of the substrate a temperature sensor 8 is arranged. The temperature sensor 8 is arranged at the lower edge of the substrate so that the temperature sensor 8 can measure the temperature of a structure upon which the substrate is arranged or adjacent.

Figure 17:
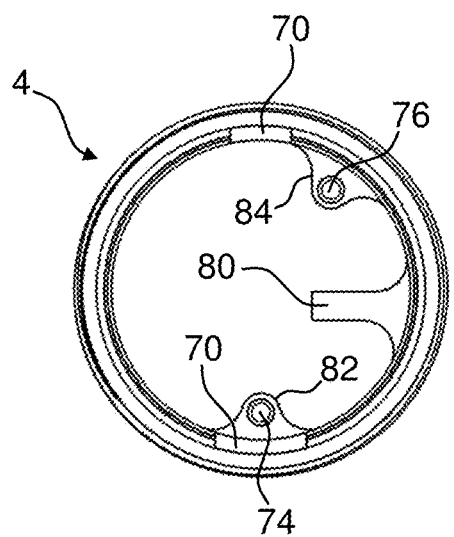
FIG. 17 shows a top view of a base of a monitoring device according to the invention.
Figure 18:
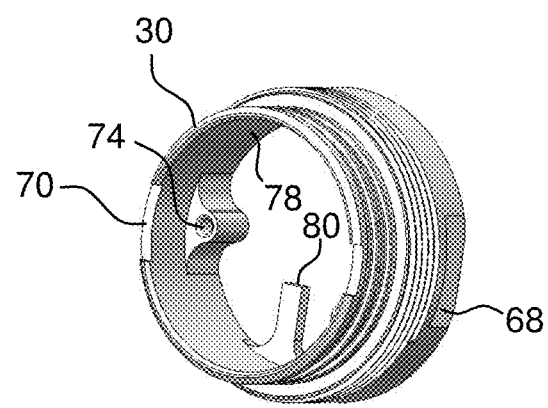
FIG. 18 shows a perspective view of the base shown in FIG. 17.
Figure 20:
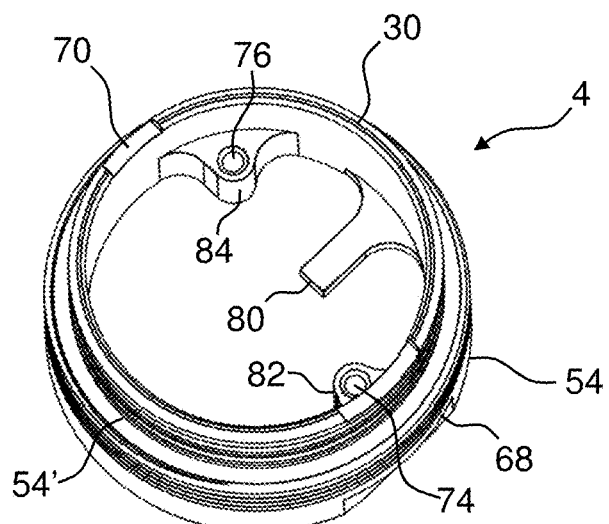
FIG. 20 shows another perspective view of the base shown in FIG. 17.

In a preferred embodiment, the temperature sensor 8 is arranged in such a position at the substrate that the temperature sensor 8 can be brought into direct or indirect (through an intermediate media such a thermally conductive gel or thermally conductive adhesive) contact with a contact surface such as the one shown in FIG. 17, FIG. 18 and FIG. 20. Hereby, the temperature sensor 8 can provide reliable temperature measurements of the base of the monitoring device and thus the equipment (e.g. a pump) to which the monitoring device is attached.

On the other side (shown in FIG. 14) of the substrate a Subscriber identity module (SIM) card holder 64 is arranged. Moreover, a vibration sensor 10 formed as an accelerometer is arranged on this side.

FIG. 15 illustrates a cross-sectional view of a base 4 of a monitoring device according to the invention. The base 4 comprises a body portion 56 having a basically cylindrical shape. The body portion 56 comprises a first threaded portion 54 having a width $D_7$ and a second threaded portion 54' having a width $D_6$. The body portion 56 comprises a flange 28 configured to receive and abut the proximal portion of the locking ring 32 (shown in FIG. 21).

The second threaded portion 54' of the body portion 56 is configured and shaped to engagingly receive a corresponding female thread of the shell 34 shown in FIG. 12. The locking ring 32 shown in FIG. 12, however, is provided with a female thread configured to engagingly receive the first threaded portion 54 of the body portion 56 of the base 4. Hereby, the shell 34 can be sealingly attached to the threaded portion 54' of the base 4. In a preferred embodiment, ring sealing gaskets 94 are arranged to seal between the shell 34 and base 4. Upon screwing the shell 34 on the threaded portion 54' of the base 4, the sealing gaskets 94 will be radially compressed. Hereby, the ring sealing gaskets 94 will be axially deformed (along the longitudinal axis of the base 4). This deformation will cause a sealing between the shell 34 and the base 4.

The base 4 comprises a threaded portion 6 protruding from the body portion 56 of the base 4. A central bore 72 is provided in the threaded portion 6. Obviously, the width $D_4$ of the bore 72 is smaller than the width $D_5$ of the threaded portion 6. It can be see that: $D_7 > D_6 > D_5 > D_4$.

The body portion comprises a first protruding portion provided with a hole 74 and a second protruding portion provided with a hole 76. The holes 74, 76 are arranged and configured to receive a male engagement structure, such as a screw. Hereby, it is possible to fix the electrical components of the monitoring device firmly to the body portion 56 of the base 4.

FIG. 16 illustrates a perspective view of some of the main components of a monitoring device according to the invention. At the top portion a battery housing 86 holding three cylindrical commercially available batteries 38 is arranged. Below the battery housing 86 a base 4 is arranged.

The battery housing 86 comprises an opening 96 configured to receive a screw. Hereby, the screw can be screwed into one of the holes 74, 76 shown in FIG. 15. Accordingly, the monitoring device is configured to attach the battery housing 86 to the body portion 56 of the base 4 in a reliable, secure and easy manner.

The base 4 corresponds to the one shown and explained with reference to FIG. 15. It can be seen that the base 4 comprises a basically cylindrical body portion 56 provided with engagement structures 68 shaped as flats to be engagingly received by a wrench. This allows for easy and fast tightening and untightening of the base 4.

The base 4 has a longitudinal axis Z, lateral axis Y and a frontal axis X. It can be see that the longitudinal axes of the batteries 38 extend parallel with the longitudinal axis Z of the base 4. Hereby, the batteries 38 will be arranged in an upright orientation when the base 4 is mounted in a horizontally extending structure.

The body portion 56 comprises a first threaded portion 54 and a second threaded portion 54'. The second threaded portion 54' is provided at the outside surface of a wall 30 of the body portion 56. Keyways 70 are provided in the rim of the wall 30. The keyways 70 are arranged and configured to receive corresponding engagement members 98 of the shell (see FIG. 21).

Figure 19:
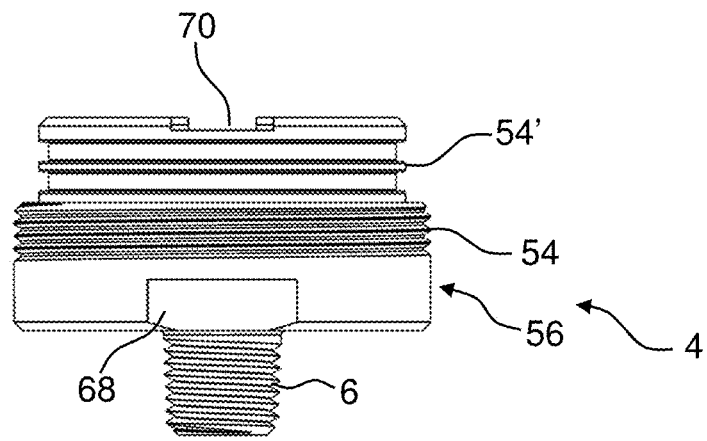
FIG. 19 shows a side view of the base shown in FIG. 17.

FIG. 17 illustrates a top view of a base 4 of a monitoring device according to the invention. FIG. 18 illustrates a perspective view of the base 4 shown in FIG. 17. FIG. 19 illustrates a side view of the base 4 shown in FIG. 17. FIG. 20 illustrates another perspective view of the base 4 shown in FIG. 17.

The base 4 corresponds to the one shown in FIG. 15 and in FIG. 16. The base 4 comprises a first protruding portion 82 provided with a hole 74. The base 4 also comprises a second protruding portion 84 provided with a hole 76.

The base 4 also comprises a contact surface 80 provided on a structure protruding from the inside surface of the wall 30 of the base 4. In a preferred embodiment, the contact surface 80 is provided on a structure protruding from the proximal portion of the base 4. The body portion 56 comprises engagement structures 68 shaped as flats to be engagingly received by a wrench.

Figure 21:
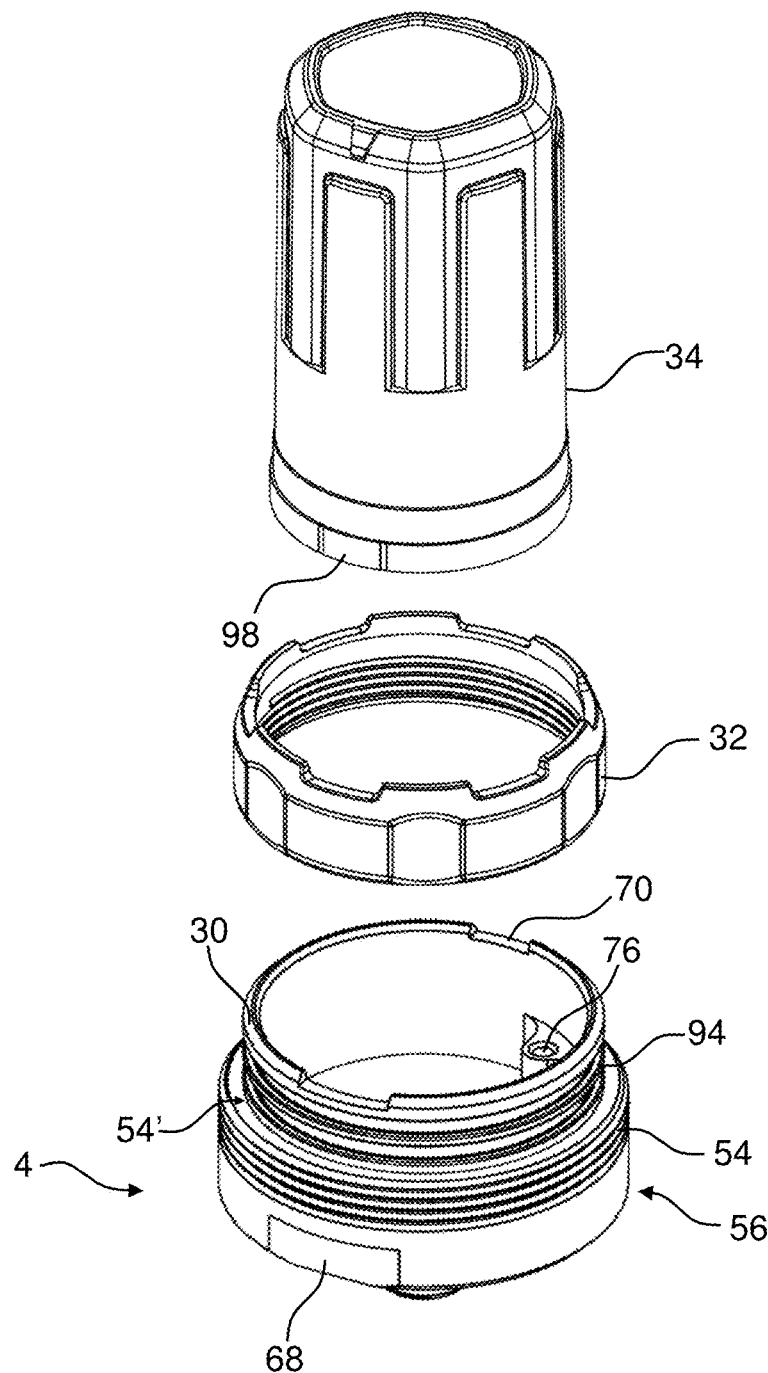
FIG. 21 shows a perspective view of some of the main components of a monitoring device according to the invention.

FIG. 21 illustrates a perspective view of some of the main components of a monitoring device according to the invention. A shell 34 is provided with an engagement member 98 that protrudes radially inwardly and is configured to fit the keyway 70 of the base (see FIGS. 17-29).

A locking ring 32 (corresponding to the one shown in FIG. 12) is arranged below the shell 34 corresponding to the one shown in FIG. 12. A base 4 (corresponding to the one shown in FIGS. 17-20) is arranged below the locking ring 32. The lower portion of the shell 34 is configured to be screwed onto the second threaded portion 54' of the base 4. It can be seen that two sealing gaskets 94 are arranged at the second threaded portion 54'.

It can be seen that the locking ring 32 comprises a female thread configured to be screwed onto the first threaded portion 54 of the base 4.

Figure 22:
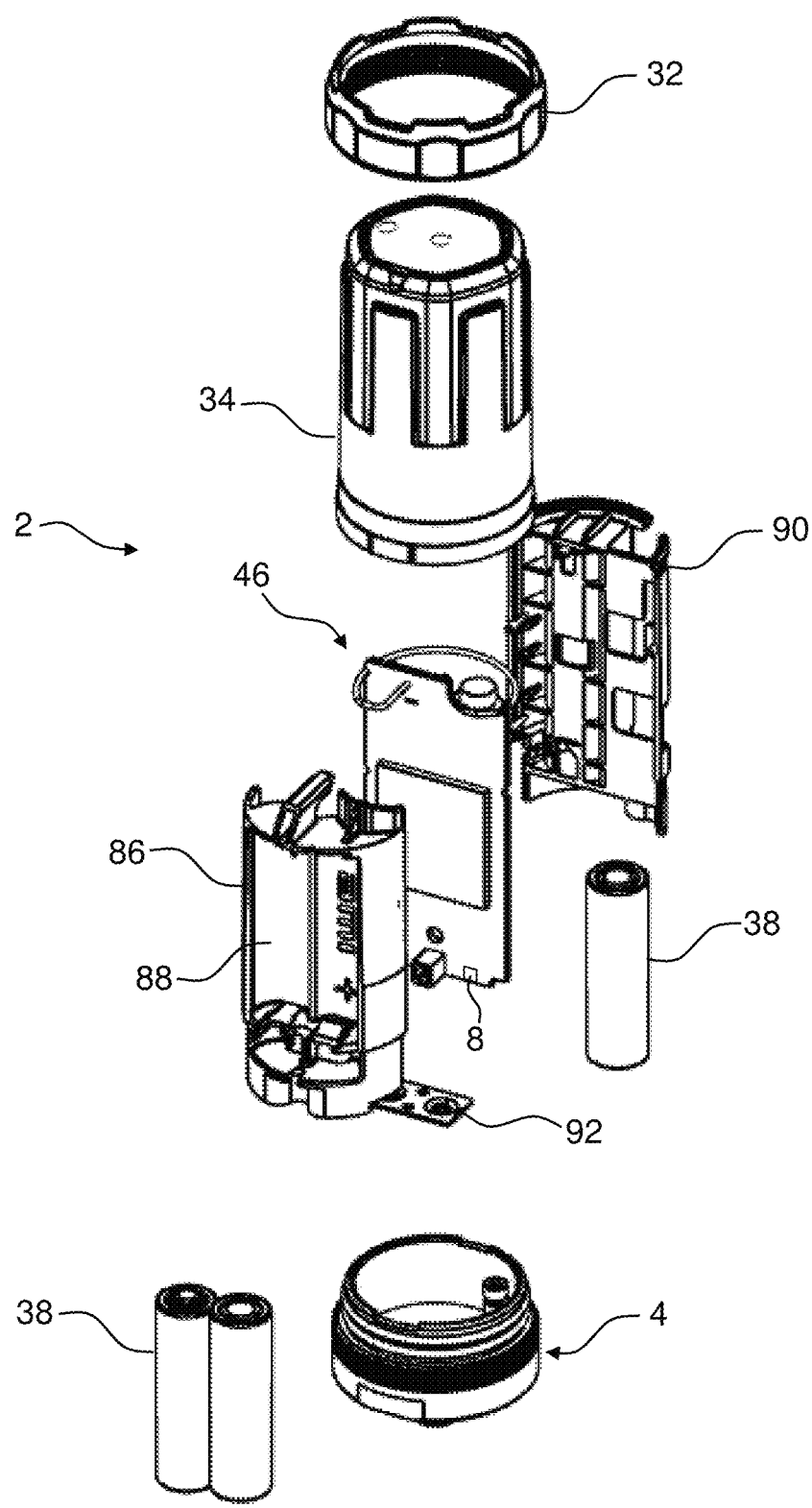
FIG. 22 shows an exploded view of a monitoring device according to the invention.

FIG. 22 illustrates an exploded view of a monitoring device 2 according to the invention. The monitoring device 2 comprises a shell 34, a locking ring 32 and a base 4 corresponding to the ones shown in FIG. 21. The monitoring device 2 moreover comprises a battery housing 86 corresponding to the one shown in FIG. 16 and a printed circuit board 46 corresponding to the one shown in FIGS. 13 and 14. The printed circuit board 46 comprises a temperature sensor 8.

The monitoring device 2 further comprises a support structure 90 configured to be attached to the battery housing 86 in a configuration, in which the printed circuit board 46 is sandwiched between the battery housing 86 and the support structure 90. The battery housing 86 comprises receiving portions 88 configured to receive and maintain a battery 38 in a fixed position relative to the printed circuit board 46.

A plate member 92 protrudes from a bottom portion of the battery housing 86. The plate member 92 is slidingly arranged and thus configured to be pushed in place so that it does not protrude from the side wall of the battery portion 86.

LIST OF REFERENCE NUMERALS

2 Monitoring device
4 Base
6 Threaded portion
8 Temperature sensor
10 Vibration sensor
12 Gateway
14 Satellite-based radio navigation system
16 Outer surface
18 Opening
20 Cloud-based structure
22 Contact surface
24 Hole
26 Recess
28 Flange
30 Wall
32 Locking ring
34 Shell
36 Cylindrical portion
38 Battery
40 Wall portion
42 Support plate
44 Male engagement structure
46 Printed circuit board
48 Plate member (e.g. insulating material)
50 Female fastening structure
52 Male fastening structure
54, 54' Threaded portion
56 Body portion
58 Battery assembly
60 Antenna
60' Near Field Communication (NFC) antenna
60" Cellular antenna
62 Cellular module
64 Subscriber identity module (SIM) card holder
68 Engagement structure
70 Keyway
72 Bore
74 Hole
76 Hole 78 Inside surface
80 Contact surface
82 Protruding portion
84 Protruding portion
86 Battery housing
88 Receiving portion
90 Support structure
92 Plate member
94 Sealing gasket
96 Opening
98 Engagement member
X, Y, Z Axis
$H_1, H_2, H_3$ Height
$D_1, D_2, D_3$ Width
$D_4, D_5, D_6, D_7$ Width

What is claimed is:

1. A wireless and cellular vibration monitoring device comprising a connection structure suitable for attaching the monitoring device to equipment to be monitored, wherein the monitoring device comprises a temperature sensor and a vibration sensor configured to remotely monitor vibration and temperature transferred to the monitoring device via the connection structure, wherein the device comprises an integrated satellite-based radio-navigation system for location detection, wherein the monitoring device comprises a base comprising a body portion and a first threaded portion constituting the connection structure, wherein the first threaded portion comprises threads and protrudes from the body portion of the base, wherein the temperature sensor is thermally connected to the body portion of the base, and wherein a shell is configured to seal against the base and hermetically enclose a space inside the shell so that no air can leave or enter the monitoring device.

2. The monitoring device according to claim 1, wherein the first threaded portion of the base comprises male threads.

3. The monitoring device according to claim 1, wherein the base comprises a wall extending along a longitudinal axis of the body portion of the base and a contact surface provided on a structure protruding from an inside surface of the wall of the base.

4. The monitoring device according to claim 3, wherein the contact surface extends perpendicular to the longitudinal axis of the body portion, wherein the temperature sensor comprises a plate-shaped contact area that is brought into thermal contact with the contact surface.

5. The monitoring device according to claim 4, wherein a contact area of the temperature sensor is attached to the contact surface by means of a thermally conductive gel or thermally conductive adhesive.

6. The monitoring device according to claim 1, wherein the monitoring device is battery driven and comprises a battery assembly or battery housing configured to receive a plurality of cylindrical commercially available batteries, wherein the battery assembly is enclosed within the shell.

7. The monitoring device according to claim 6, wherein the battery assembly or battery housing comprises an upright wall portion allowing an upright mounting of the batteries.

8. The monitoring device according to claim 6, wherein the monitoring device comprises a locking ring arranged to lockingly fix the shell to the base.

9. The monitoring device according to claim 8, wherein the monitoring device comprises one or more ring sealing gaskets arranged to seal between the shell and a second threaded portion of the base.

10. The monitoring device according to claim 8, wherein the shell comprises a cylindrical portion provided with a fastening structure, wherein the locking ring is provided with a fastening structure arranged and shaped to fit the fastening structure of the cylindrical portion.

11. The monitoring device according to claim 10, wherein the fastening structure of the cylindrical portion is a male fastening structure and the fastening structure of the-locking ring is a female fastening structure arranged and shaped to fit the male fastening structure of the cylindrical portion.

12. The monitoring device according to claim 1, wherein the monitoring device comprises a printed circuit board, wherein the vibration sensor and the temperature sensor are integrated with the printed circuit board.

13. The monitoring device according to claim 12, wherein the temperature sensor is arranged in such a position of the printed circuit board that the temperature sensor is brought into direct contact with the base.

14. The monitoring device according to claim 1, wherein a width of the first threaded portion is smaller than the width of the body portion.

15. The monitoring device according to claim 1, wherein the body portion comprises a flange.

16. The monitoring device according to claim 15, wherein a second threaded portion protrudes from the flange, wherein the second threaded portion has a width that is smaller than a width of the body portion and larger than a width of the first threaded portion.

17. The monitoring device according to claim 1, wherein the body portion comprises a first protruding portion provided with a hole.

18. The monitoring device according to claim 17, wherein the body portion comprises a second protruding portion provided with a hole.

19. The monitoring device according to claim 1, wherein a central bore is provided in the first threaded portion.

20. The monitoring device according to claim 1, wherein one or more antennas are completely enclosed within the shell.

* * * * *